Oct. 5, 1965     J. C. STILES ETAL     3,209,600
ANGULAR ACCELEROMETER
Filed Aug. 1, 1962     5 Sheets-Sheet 1

JOHN C. STILES
ALAN TURL
INVENTORS

BY *Sal A. Giarratana*

ATTORNEYS

Oct. 5, 1965    J. C. STILES ETAL    3,209,600
ANGULAR ACCELEROMETER
Filed Aug. 1, 1962    5 Sheets-Sheet 2

JOHN C. STILES
ALAN TURL
INVENTORS

BY *Sal A. Giarratana*

ATTORNEYS

Oct. 5, 1965 J. C. STILES ETAL 3,209,600
ANGULAR ACCELEROMETER
Filed Aug. 1, 1962 5 Sheets-Sheet 3

JOHN C. STILES
ALAN TURL
INVENTORS

BY Sal A. Giarratana

ATTORNEYS

Oct. 5, 1965

J. C. STILES ETAL 3,209,600

ANGULAR ACCELEROMETER

Filed Aug. 1, 1962

JOHN C. STILES
ALAN TURL
*INVENTORS*

BY *Sal A. Giarratana*

ATTORNEYS

JOHN C. STILES
ALAN TURL
INVENTORS

ATTORNEYS

United States Patent Office 3,209,600
Patented Oct. 5, 1965

3,209,600
ANGULAR ACCELEROMETER
John C. Stiles, Morristown, N.J., and Alan Turl, London, England, assignors to General Precision Inc., Little Falls, N.J., a corporation of Delaware
Filed Aug. 1, 1962, Ser. No. 214,006
9 Claims. (Cl. 73—516)

The present invention relates to accelerometers, and more particularly to an angular accelerometer using fluid as the inertia element.

Prior to the present invention, most angular accelerometers used metal rotors mounted on springs or pivots as the inertia element. The present invention uses fluid as the inertia element and is based on the principle that when a toroid filled with a fluid is accelerated, the fluid inside the toroid will remain stationary in space. However, if a diaphragm is placed across the toroid the fluid will be accelerated with the toroid and a pressure differential produced across the diaphragm. This pressure differential will be a function of the acceleration and therefore the deflection of the diaphragm produced by the pressure differential will also be a function of the acceleration. It has been found that a linear relationship exists between acceleration and pressure and also, providing the deflection of the diaphragm is small relative to its thickness, i.e., one-third the thickness of the diaphragm, a linear relationship will exist between the deflection of the diaphragm and pressure. Thus by measuring the deflection of the diaphragm it is possible to measure the acceleration to which the unit is being subjected.

A fundamental requirement of an angular accelerometer is that it should not respond to motions of any sort except angular acceleration about the sensitive axis. A device such as that described above would in fact be sensitive to linear accelerations due to the effective mass of a diaphragm floated causing itself to deflect and thus indicate an angular acceleration. In order to distinguish between linear and angular acceleration, one embodiment of the invention provides a housing filled with fluid having two parallel spaced apart diaphragms therein coaxially aligned with one another. The fluid is an electrolyte and an electrolytic pickoff is positioned between the diaphragms to produce an output signal proportional to the amount of electrolyte between the pickoff and each of the diaphragms. The housing is constructed so that linear acceleration causes the fluid to produce a pressure differential across the diaphragms to deflect them in the same direction so that the electrolyte between one of the diaphragms and the pickoff is reduced and the electrolyte between the other diaphragm and the pickoff is increased an equal amount. Since the two offset one another, no output signal is produced. Angular acceleration causes the diaphragms to deflect away from one another to increase the amount of electrolyte between the pickoff and each of the diaphragms to produce an output signal proportional to the angular acceleration. In accordance with another embodiment of the invention, four diaphragms are orthogonally mounted in the same plane in a housing filled with fluid. The two diaphragms on one axis deflect in one direction and the other two on the other axis deflect in the opposite direction in response to fluid pressure differentials thereacross produced by angular acceleration about the sensitive axis. This unbalanced condition is detected by a suitable detecting means to produce an output signal proportional to the angular acceleration. The housing is so constructed that the fluid produces pressure differentials in response to linear and other rotational accelerations to deflect the diaphragms in other directions so that no output signal is produced.

Accordingly, it is one object of the invention to provide an accelerometer which uses fluid as the inertia element.

It is another object of the invention to provide an angular accelerometer using fluid as the inertia element which produces an output signal proportional to the angular acceleration.

It is a further object of the invention to provide an angular accelerometer using fluid as the inertia element which produces an output signal proportional to the angular acceleration about the sensitive axis and does not produce an output signal in response to other accelerations.

It is a still further object of the invention to provide an accelerometer using fluid as the inertia element wherein the fluid produces pressure differentials across diaphragms to deflect the diaphragms proportional to the acceleration.

It is a still further object of the invention to provide an electrolytic pickoff for producing an output signal in response to the deflection of the diaphragms as described above.

It is a still further object of the invention to provide an electrolytic pickoff for producing an output signal proportional to the amount of electrolyte between two terminals thereof, the electrolyte between the terminals varying in response to certain conditions so that the output signal provides an indication of said conditions.

It is a still further object of the invention to provide an angular accelerometer which is rugged in construction, reliable in operation, very accurate, and sensitive to acceleration about one axis only.

Other objects and features of novelty of the present invention will be specifically pointed out or will otherwise become apparent when referring, for a better understanding of the invention, to the following description taken in conjunction with the accompanying drawings, wherein.

Figure 2:
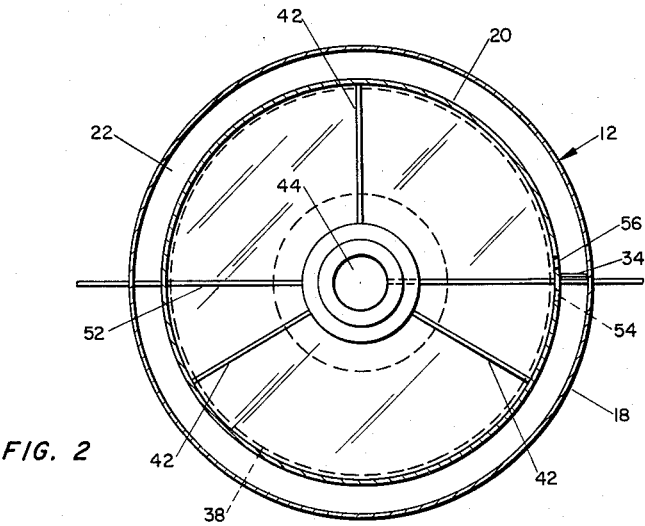
FIG. 2 is a sectional view taken on the line 2—2 of FIG. 1.
Figure 1:
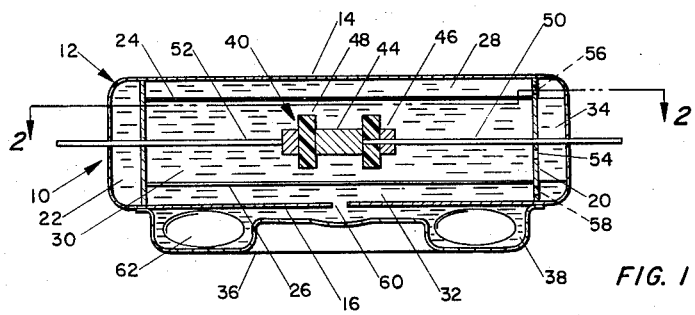
FIG. 1 is a cross-sectional view of an angular accelerometer embodying features of the invention.

Referring to FIGS. 1 and 2, an accelerometer 10 illustrating one embodiment of the invention is shown which comprises a circular housing 12 having a top wall 14, a bottom wall 16 and a cylindrical wall 18. A cylindrical partition 20 is fixed within the housing 12 to define an outer annular chamber 22. Diaphragms 24 and 26 are fixed to the partition 20 perpendicular to and concentric with the axis of the housing 12, hereinafter referred to as the sensitive axis, to divide the portion of the housing within the partition into an upper chamber 28, a middle chamber 30 and a lower chamber 32. A baffle 34 coextensive in height with the middle chamber 30 extends radially between, and is fixed to, the partition 20 and wall 18 of the housing for a purpose to be described, and a cover 36 is fixed to the bottom wall 16 of the housing to form an annular chamber 38 for a purpose also to be described.

The diaphragms 24 and 26 are made of a suitable non-conductive flexible material, preferably thin sheets of glass. An electrolytic pickoff 40 is suitably supported concentric with the sensitive axis, such as by radially extending arms 42, exactly midway between the diaphragms 24 and 26 when they are in the position illustrated in FIG. 1. The electrolytic pickoff 40 comprises an inner electrode 44 insulated from an outer electrode 46 by a ring 48 of suitable insulating material. The entire housing 12 is completely filled with a suitable electrolytic fluid, and electrical connection made to the inner and outer electrodes 44 and 46 by leads 50 and 52, respectively, which may be connected to a suitable output circuit (not shown) to provide an output signal proportional to the amount of electrolyte between the inner and outer electrodes 44 and 46. The amount of electrolyte between the electrodes is determined by the spacing between the ends of the insulating ring 48 and the diaphragms 24 and 26 adjacent thereto. As illustrated in FIG. 1, this spacing is equal. The annular chamber 22 is communicated with the middle chamber 30 by an aperture 54 in the partition 20 on one side of the baffle 34, and is communicated with the upper and lower chambers 28 and 32 by apertures 56 and 58, respectively, on the opposite side of the baffle 34. An aperture 60 is provided in the bottom wall 16 of the housing to communicate the lower chamber 32 with the space between the bottom wall 16 and cover 36 which space, in turn, communicates with the annular air bubble chamber 38 in which an annular bubble 62 is trapped for pressurizing the fluid in the housing to compensate for expansion and contraction of the fluid in response to temperature changes.

Figure 3:
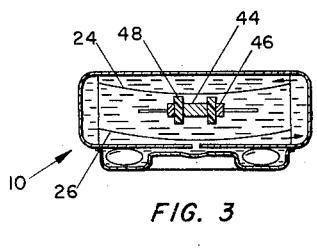
FIG. 3 is a sectional view similar to FIG. 1 illustrating the positions the diaphragms assume in response to linear acceleration.

In operation, when the housing 12 is accelerated linearly in an upward direction along the sensitive axis, the diaphragms 24 and 26 are deflected downwardly as illustrated in FIG. 3, the amount of deflection of the diaphragms being exaggerated for the sake of clarity. The spacing between the ring 48 and upper diaphram 24 decreases and the spacing between the ring and the lower diaphragm 26 increases an equal amount so that there is no change in the current flow between the electrodes 44 and 46 and consequently no output signal. When the diaphragms are displaced in this manner, fluid from the lower chamber 32 is forced through the aperture 58 into the annular chamber 22, and fluid from the annular chamber 22 flows through the aperture 56 in the partition 20 into the upper chamber 28 as a result of the pressure differentials produced across the diaphragms 24 and 26 by the linear acceleration. Linear acceleration of the housing downwardly along the sensitive axis deflects the diaphragms upwardly.

Figure 4:
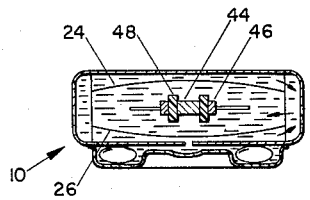
FIG. 4 is a sectional view similar to FIG. 1 illustrating the position the diaphragms assume in response to angular acceleration.

However, when the housing 12 is angularly accelerated about the sensitive axis in a clockwise direction as viewed in FIG. 2, the pressure differentials across the diaphragms 24 and 26 deflect the diaphragms apart from one another as illustrated in FIG. 4 and the current flow between the inner and outer electrodes 44 and 46 increases in proportion to the angular acceleration. To explain this, the pressure of the fluid in the annular chamber 22 increases on the clockwise side of the baffle 34 on which side the aperture 54 is positioned, and decreases on the other side of the baffle on which the apertures 56 and 58 are positioned. This pressure differential causes fluid to flow from the annular chamber 22 through the aperture 54 into the middle chamber 30, and the fluid flowing from the annular chamber is replaced by fluid from the upper and lower chambers 28 and 32 flowing through the apertures 56 and 58 into the annular chamber 22 so that diaphragms are free to deflect apart as illustrated in FIG. 4. When the clockwise angular acceleration ceases and the housing is rotating at a constant speed, the diagrams return to their position illustrated in FIG. 1.

When the housing decelerates or is rotatably accelerated in a counter-clockwise direction, a counter-clockwise acceleration is produced which causes the diaphragms 24 and 26 to deflect toward one another. This occurs because the pressure in the annular chamber 22 on the side of the baffle 34 on which the apertures 56 and 58 are disposed will increase in response to the counter-clockwise acceleration, and the pressure on the side of the baffle 34 on which the aperture 54 is disposed will decrease. Therefore fluid will flow from the annular chamber 22 through the apertures 56 and 58 into the upper and lower chambers 38 and 32, and fluid will flow from the middle chamber 30 through the aperture 54 into the annular chamber 22 to allow diaphragms to freely deflect inwardly toward one another, as described. Of course, as the diaphragms deflect toward one another, the current flow between the electrodes 44 and 46 decreases to provide an indication of the angular acceleration.

From the foregoing, it will be apparent that the angular accelerometer 10 provides an accurate and simple indication of angular acceleration which is inherently insensitive to linear acceleration, the most critical defect of prior instruments when used in the control systems of missiles and aircraft.

Although in the embodiment of the angular accelerometer 10 just described, an electrolytic pickoff was used, it will be appreciated that other types of signal devices can be used in place of the electrolytic pickoff. For example, a non-conductive fluid could be substituted for the electrolytic fluid filling the housing 12 and a capacitive takeoff substituted for the electrolytic pickoff to provide an output signal proportional to the capacitance between the takeoff and each of the diaphragms 24 and 26. However, the electrolytic pickoff is preferred since it provides a simple, inexpensive, accurate and reliable means of detecting the diaphragm position. Further, this unique electrolytic pickoff can be used in applications other than the accelerometer described herein such as, for example, to sense temperature changes by measuring the change in the current flow between the electrodes 44 and 46 resulting from changes in the electrolyte between the electrodes of the pickoff caused by temperature changes.

Figure 5:
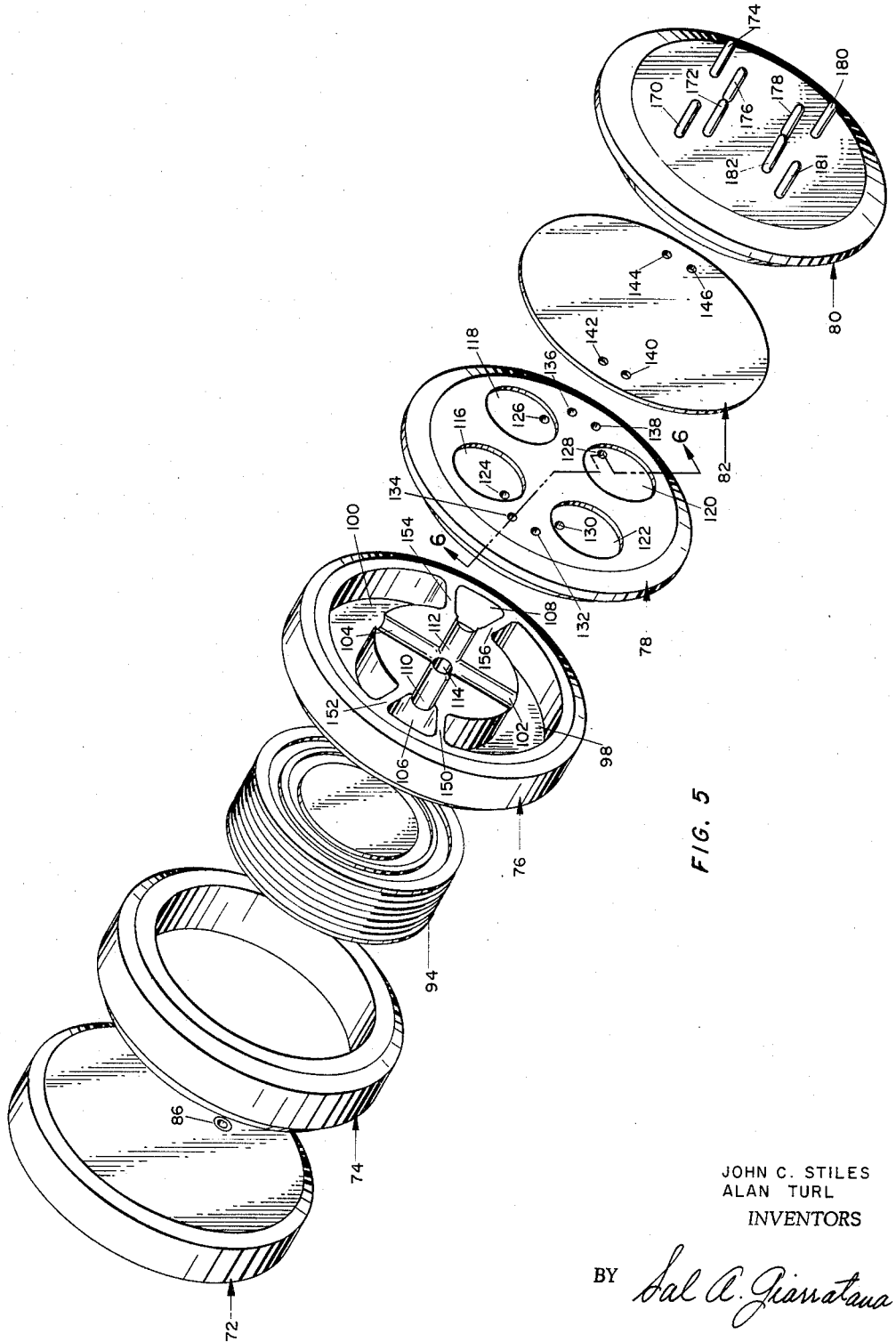
FIG. 5 is an exploded view of the components of another embodiment of the invention.
Figure 6:
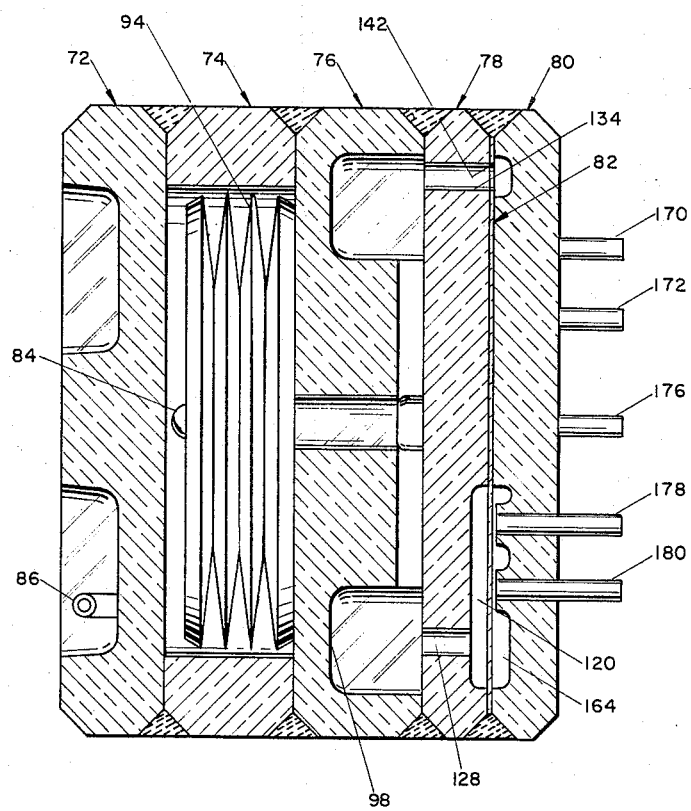
FIG. 6 is an assembled sectional view of the structure illustrated in FIG. 5 taken on the line 6—6 of FIG. 5.
Figure 7:
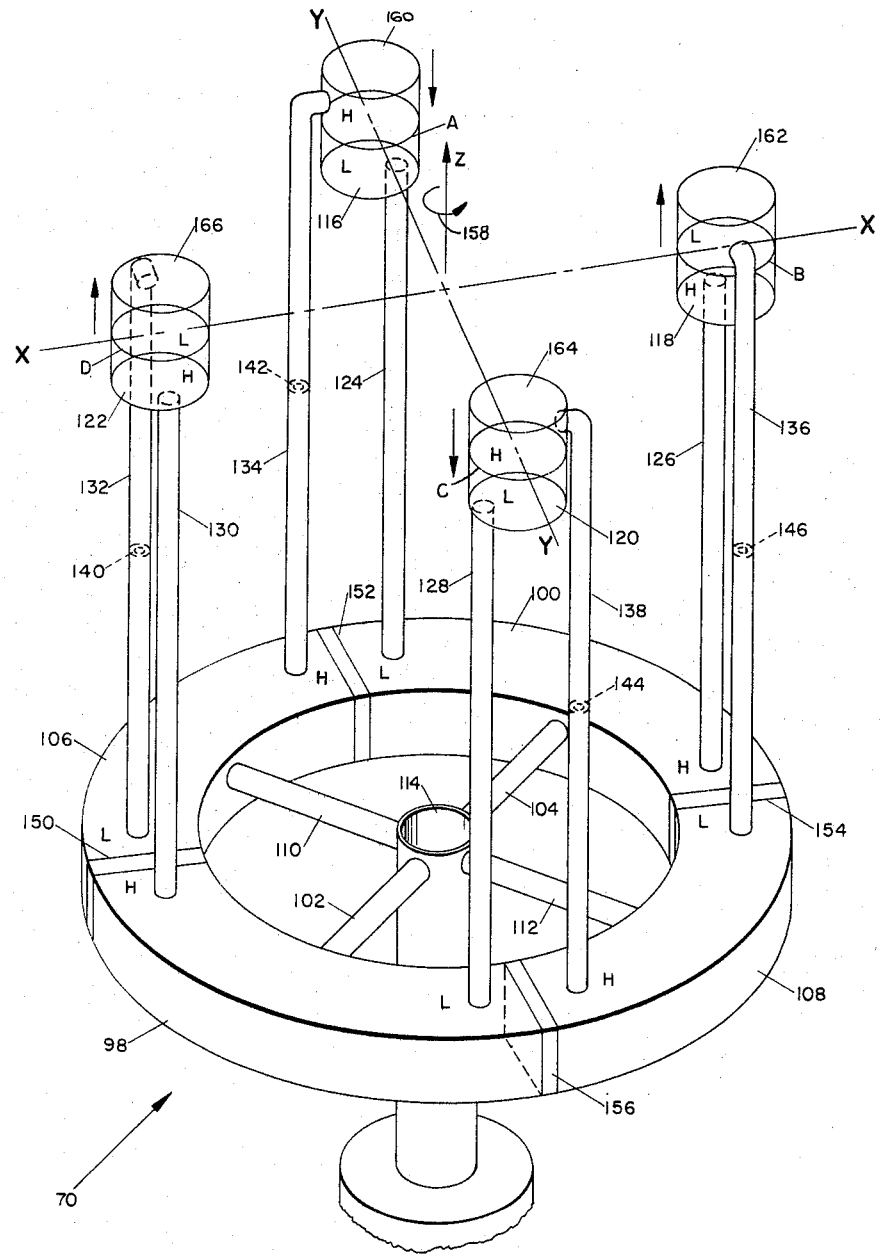
FIG. 7 is a schematic view of the structure illustrated in FIG. 5.

Referring to FIGS. 5–7, an angular accelerometer 70 illustrating another embodiment of the invention is shown. It comprises a cylindrical body having five separate cylindrical layers 72–80 preferably made of glass and bonded together in a sandwich fashion. The five layers of glass are more clearly illustrated in FIGURES 5 and 6 and comprise a bottom layer 72, a bellows ring 74, a pressure layer 76, a diaphragm layer 78 and a top layer 80 to provide four separate diaphragms, as will be described in greater detail hereinafter.

The bottom layer 72 has a fill tube 86 extending therethrough to enable the accelerometer to be filled with a suitable electrolyte, as will be described in greater detail hereinafter. A bellows 94 is positioned within the bellows ring 74 and is sealed at 84 after being filled with a suitable gas.

The pressure layer 76 has arcuate chambers 98 and 100 on the right face thereof as viewed in FIGURE 5 interconnected by radial grooves 102 and 104. Diametrically opposed chambers 106 and 108 are formed between the adjacent ends of each of the arcuate chambers 98 and 100 and separated therefrom by partitions 150, 152, 154, 156. The chambers 106 and 108 are interconnected by radial grooves 110 and 112 which communicate at their inner ends with the inner ends of the radial grooves 102 and 104. A central bore 114 extends through the pressure layer 76 to communicate the juncture between the radial arms with the left face of the pressure layer as viewed in FIG. 5.

The diaphragm layer 78 is bonded to the right face of the pressure layer 76 to seal off the various chambers and their interconnecting radial grooves and has four circular recesses 116, 118, 120, 122 on the right face thereof. Recesses 116, 118, 120, 122 are equiangularly disposed about, and at equal radial distances from, the sensitive axis Z through the housing. A plurality of passageways 124, 126, 128, 130 extend transversley through the diaphragm layer 78, and the right ends thereof communicate with each of the recesses 116, 118, 120, 122, respectively, to enable fluid to pass through the passageways and into each of the recesses after the upper layer 80 is joined to the right face of the diaphragm layer 78 to seal off the recesses, as will be described in greater detail hereinafter. The other ends of the passageways 124, 126, 128, 130 communicate directly with the ends of the arcuate chambers 98 and 100 which they overlie. The diaphragm layer 78 is also provided with a pair of passageways 132 and 134 positioned between the passageways 130 and 124, and a pair of passageways 136 and 138 between the passageways 126 and 128 to pass fluid from the chambers 106 and 108 to the right face of the diaphragm layer 78 for a purpose to be described. The diaphragm sheet 82 is sandwiched between the diaphragm layer 78 and the top layer 80 and has a plurality of apertures 140, 142, 144, 146 therein aligned with the passageways 132, 134, 136, 138, respectively, in the diaphragm layer 78 to enable fluid from the passageways to pass through the diaphragm sheet. Otherwise the diaphragm layer 82 seals off the recesses 116, 118, 120, 122.

The left face (not shown) of the top layer 80 is likewise provided with recesses (160, 162, 164, 166 in FIGURE 7) identical to the recesses 116, 118, 120, 122 and aligned accurately therewith. Four grooves are also provided in the left face of the top layer 80 to communicate each of the apertures 140, 142, 144, 146 in the diaphragm sheet 82 with the recess in the left face of the top layer adjacent thereto. With this construction, the diaphragm sheet 82 forms four separate diaphragms (A, B, C and D in FIGURE 7) separating the orthogonally positioned recesses in the faces of the diaphragm layer 78 and top layer 80 so that when the accelerometer 70 is completely filled with electrolytic fluid, the recesses on both sides of each of the diaphragms are completely filled and communicate with the various chambers in the pressure layer 76 by the passageways in the diaphragm layer 78. This can be seen most clearly in the schematic view illustrated in FIGURE 7, wherein all of the glass has been removed and only the fluid that completely fills the various chambers and passageways of the accelerometer is shown. The numbers used in FIGURE 7 to designate the different parts of the fluid are those of the chambers, passageways and recesses in which the fluid is positioned. For example, the fluid in the arcuate chamber 98 is designated as arcuate chamber fluid 98, and so forth. From FIGURE 7 it can be seen that the arcuate chamber fluid 98 and 100 is separated from the diametrically opposed chamber fluid 106 and 108 by partitions 150, 152, 154, 156. The radial passageway fluid 102, 104, 110 and 112 is also shown communicating their respective chamber fluids with the central bore fluid 114 which in turn communicates with the fluid surrounding the bellows 94.

As illustrated in FIGURE 7, the accelerometer 70 is being angularly accelerated about its sensitive axis Z in a counter-clockwise direction as indicated by the arrow 158 thereabove, and, therefore, the fluid on the counter-clockwise side of each of the partitions 150, 152, 154, 156 is at a higher pressure than the fluid on the clockwise side of each of the partitions. These high and low pressure conditions have been indicated by the letters H and L. The diaphragm sheet 82 provides the four diaphragms A, B, C and D and the recess fluid 160, 162, 164, 166 is illustrated thereabove and the recess fluid 116, 118, 120, 122 therebelow. It will be observed that the passageway fluid 124 communicates the low pressure side of the arcuate chamber fluid 100 with the recess fluid 116 below the diaphragm A and the passageway fluid 134 communicates the high pressure end of the chamber fluid 106 with the recess fluid 160 above the diaphragm A. Therefore the fluid above the diaphragm has been indicated as being at a high pressure H, and the fluid below the diaphragm at a low pressure L. The recess fluid 164 and 120 above and below the diaphgm C on the same axis Y as the diaphragm A is connected to the H and L portions of the fluid 108 and 98, respectively, by passageway fluid 138 and 128, respectively.

Figure 8:
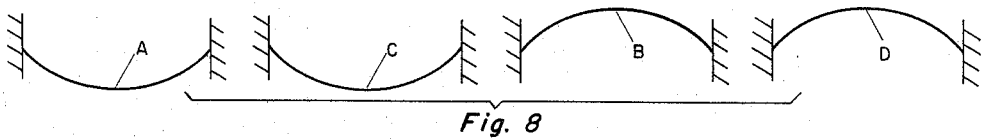
FIG. 8 is a schematic view of the position assumed by the diaphragms in the accelerometer illustrated in FIG. 7 in response to angular acceleration about the sensitive axis.
Figure 9:
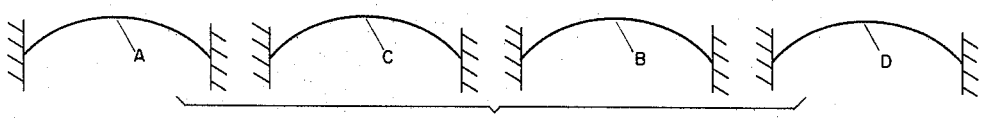
FIG. 9 is a schematic view similar to FIG. 8 illustrating the positions assumed by the diaphragms in response to linear acceleration downwardly along the sensitive axis.
Figure 10:
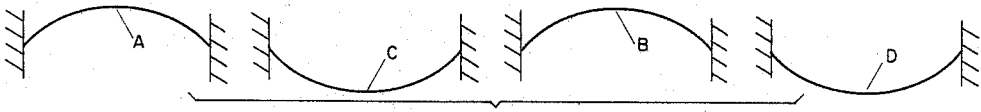
FIG. 10 is a schematic view similar to FIG. 8 illustrating the position the diaphragms assume in response to all other rotation motions.

The pressure above and below the diaphragms B and D on the same axis X is reversed from the pressure above and below the diaphragms A and C. The recess fluid 166 above the diaphragm D is connected to the low pressure side of the chamber fluid 106 by the passageway fluid 132 and the recess fluid 122 below the diaphragm D is connected to the high pressure end of the arcuate chamber fluid 98 by the passageway fluid 130. Similarly the recess fluid 162 above the diaphragm B on the same axis X is connected to the low pressure end of the chamber fluid 108 by the passageway fluid 136 and the recess fluid 118 below the diaphragm is connected to the high pressure end of the arcuate chamber fluid 100 by the passageway fluid 126. Therefore when the angular accelerometer 70 is angularly accelerated in a counter-clockwise direction as illustrated, the pressure differential across each of the diaphragms will deflect the diaphragms B and D on the X axis upwardly as indicated by the arrows adjacent thereto, and will deflect the diaphragms A and C on the Y axis downwardly as indicated by the arrows adjacent thereto. This deflection of the diaphragms is illustrated schematically in FIG. 8. When the accelerometer 70 is angularly accelerated in a clockwise direction about the sensitive axis, the deflection of each of the diaphragms will be reversed. When the accelerometer is linearly accelerated, each of the four diaphragms will deflect in the same direction, as illustrated in FIG. 9 for example for a downward acceleration. For all other rotational motions the diaphragms A and C will deflect in opposite directions relative to one another and the diaphragms B and D will deflect in opposite directions relative to one another, as illustrated in FIG. 10.

Referring to FIG. 5 as well as FIG. 7, this deflection of the diaphragms is detected by electrodes 170 and 172 projecting into the fluid above the diaphragm A, electrodes 174 and 176 projecting into the fluid above the diaphragm B, electrodes 178 and 189 projecting into the fluid above the diaphragm C and electrodes 181 and 182 projecting into the fluid above the diaphragm D. Each of the electrodes is made of a suitable material, such as platinum, and the face of each of the diaphragms presented towards the electrodes is coated with a suitable conductive film such as platinum so that current will flow from one electrode of each pair, through the electrolyte, through the conductive film coated on the face of the diaphragm and back through the electrolyte to the other electrode. With this construction it is apparent that the current flow between each pair of electrodes will decrease as the diaphragm associated therewith deflects towards the electrodes and increase as the diaphragm deflects away from the electrodes. The different pairs of the electrodes may be connected to a suitable bridge circuit, such as the one illustrated in FIG. 11, for example, which includes resistors 186 and 188 with an A.C. power supply 190 connected thereacross. The electrode 170 is connected between the A.C. supply and the resistor 186, and the electrode 182 is connected between the A.C. supply and the resistor 188. The electrode 172 is connected in series with the electrode 174, the electrode 176 is connected in series with the electrode 181, and terminals 192 and 194 are connected to juncture points between the resistors 186 and 188 and the electrodes 180 and 174, respectively, to produce a voltage output thereacross when the bridge is unbalanced.

With this construction the electrolyte-filled gaps between the electrodes 170, 172 and 178, 180 are connected in series as one leg of the bridge and the gaps between the electrodes 174, 176 and 181, 182 are connected in series as another leg of the bridge. Therefore it will be apparent that the bridge circuit will be unbalanced by the deflection of the diaphragms A, B, C and D as illustrated in FIG. 8 in response to angular acceleration about the sensitive axis Z so as to produce an output signal across the terminals 192 and 194 proportional to the deflection of the diaphragms. However, when the diaphragms deflect as illustrated in FIG. 9 in response to linear acceleration, or as illustrated in FIG. 10 in response to all other rotational accelerations, the bridge circuit will not be unbalanced and substantially no output signal will be produced across the terminals.

Figure 11:
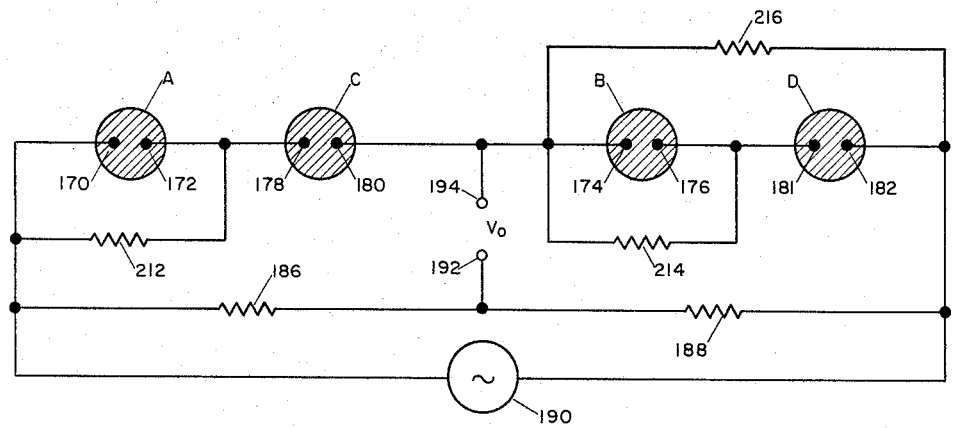
FIG. 11 is a schematic view of the electrodes connected in a bridge circuit.

In order to compensate for any error in the output resulting from deflection of diaphragms A, B, C and D caused by their own mass, trimming or padding resistors 212, 214, 216 may be connected in parallel with the electrodes as illustrated in FIG. 11, the resistor 212 being connected in parallel with the gap between the electrodes 170, 172, the resistor 214 in parallel with the gap between the electrodes 174, 176, and the resistor 216 in parallel with both of the gaps between the electrodes 174, 176 and the electrodes 181–182. The value of the trimming resistors and the resistors 186 and 188 may be determined experimentally by the following procedure.

The bridge circuit of FIG. 11 (without the trimming resistors 214 and 216 and with a first variable resistor substituted for the trimming resistor 212) is connected to a completed accelerometer 70. A second variable resistor is connected in series between the resistors 186 and 188 with the pot wiper arm thereof connected to the terminal 192. The variable resistors are then adjusted until a zero output is produced at the output terminals 192, 194. The accelerometer is then oscillated about the Y axis (FIG. 7), at, for example, a frequency of 23 c.p.s. and an amplitude of .400″. If an output signal is produced the oscillation is stopped and the variable resistors adjusted to attempt to eliminate the output signal. This procedure is repeated and the variable resistors progressively adjusted until a minimum output signal is obtained. The value of the first variable resistor is then measured and a fixed resistor 212 of equal value substituted in its place.

A third variable resistor is then connected in parallel with the gap between the electrodes 174, 176 and the second variable resistor adjusted with the device at a standstill to produce a zero output. The device is then oscillated about the X axis (FIG. 7) in a similar manner and stopped periodically to progressively adjust the second and third variable resistors. When a minimum output signal is obtained, the value of the third variable resistor is measured and a fixed resistor 214 of equal value substituted in its place.

A fourth variable resistor is then connected in parallel with the gaps between the electrodes 174, 176 and 181, 182 and the second variable resistor adjusted until a zero output is obtained. The device is then mounted on a high speed rotating table with the sensitive axis Z (FIG. 7) parallel to or on a line passing perpendicularly through the axis of rotation of the table. This effectively exposes the diaphragms to linear acceleration. The second and fourth variable resistors are then progressively adjusted to produce a minimum output signal and the fourth variable resistor measured and a fixed resistor 216 of equal value substituted in its place. If desired the values of the fixed resistors 186 and 188 can be increased to include the portions of the second variable resistor in their respective legs of the bridge circuit and the second variable resistor eliminated.

In order to control the damping of the fluid in the accelerometer 70, a relatively high viscosity electrolyte fluid can be employed or orifice damping may be employed by reducing the size of the apertures 140, 142, 144, 146 in the diaphragm sheet 82 to restrict the flow through the passageways 132, 134, 138 and 136. This is illustrated schematically in FIG. 7 by apertured diaphragms 140, 142, 144, 146 in the passageway fluid 132, 134, 138 and 136, respectively. The accelerometer is preferably made of glass, since glass lends itself to the sandwich construction illustrated, is not affected by the corrosive action of the electrolyte, and offers good dimensional stability. The latter feature is very important since the layers 72, 74, 76, 78, 80 of the accelerometer 70 must be made with precision so that they will fit together properly with all of the chambers and recesses accurately positioned relative to one another and relative to the sensive axis Z.

The diaphragm sheet 82 must be made with the greatest care in order to provide the diaphragms A, B, C and D with the desired deflection characteristics. In the embodiment illustrated, the sheet 82 is machined to a diameter of 1.25 inches and a thickness of $\frac{1}{32}$ of an inch. One face thereof is then coated with a platinum film to provide the electrically conductive layer previously mentioned, and the metallized face is placed on a glass optical flat. The other face is then ground to a rough thickness and lapped to the final thickness. The four apertures 140, 142, 144, 146 are then lapped in the diaphragm sheet 82 before it is removed from the glass optical flat to avoid unnecessary handling of the diaphragm sheet.

The diaphragm sheet is then carefully removed from the glass optical flat, washed in a suitable solvent such as the electrolyte that is used to fill the accelerometer, and carefully sandwiched between the diaphragm layer 78 and top layer 80. At this point it is also noted that the projecting ends of the four pairs of electrodes are also ground and lapped after they have been accurately fixed in the top layer 80 to make certain they are each spaced the same predetermined distance from the diaphragms A, B, C and D.

In accordance with one method of assembling and filling the accelerometer 70, the various layers thereof are accurately oriented and bonded together with a suitable bonding material. After the bonding material has dried, the accelerometer is transferred to a fusing fixture and heat and pressure are applied to fuse the layers together. The unit is then allowed to cool to room temperature and then placed on blocks in a dish with the fill tube 86 down and the dish filled with more than enough electrolyte to fill the unit. The setup is then evacuated at room temperature for about a half hour. When the vacuum is broken the atmospheric pressure acting on the surface of the electrolyte in the dish forces the electrolyte up into the unit through the fill tube 86 which is then sealed off. If the accelerometer must be capable of operating over the entire temperature range, the above filling process may take place at −65.5° C., or the electrolyte filled under a predetermined pressure.

While it will be apparent that the embodiments of the invention herein disclosed are well calculated to fulfill the objects of the invention, it will be appreciated that the invention is suscetible to modification, variation and change without departing from the proper scope or fair meaning of the subjoined claims.

What is claimed is:

1. An angular accelerometer comprising a circular housing having a cylindrical wall and top and bottom walls, a cylindrical partition positioned coaxially within said housing and cooperating with said cylindrical wall to define an annular chamber, a pair of diaphragms extending across said partition perpendicular to the axis of said housing to divide the space within said partition into an upper chamber, a middle chamber and a lower chamber, fluid filling all of the chambers of said housing, detecting means suported within said middle chamber for producing an output signal in response to the position of said diaphragms relative thereto, baffle means extending substantially radially across said annular chamber, a first aperture in said partition on one side of said baffle means communicating said annular chamber with said middle chamber, and second and third apertures in said partition on the other side of said baffle means for communicating said annular chamber with said upper and lower chambers.

2. The invention as defined in claim 1 wherein said fluid is an electrolyte and said detecting means comprises first and second electrodes spaced apart by insulating material so that the current flow between said electrodes is determined by the quantity of electrolyte between said insulating material and each of said diaphragms.

3. The invention as defined in claim 1 including a pressure chamber communicating with one of said other chambers, and variable volume means for pressurizing the fluid in said pressure chamber.

4. An angular accelerometer comprising:
a housing;
partition means defining within said housing four substantially identical cavities equiangularly disposed about, and at equal radial distances from, an axis through said housing;
a diaphragm in each of said cavities, each diaphragm lying in a common plane substantially perpendicular to said axis and subdividing the respective cavities into corresponding first and second compartments disposed respectively on opposite sides of said plane, each of said diaphragms being deflectable in response to pressure differentials extant between the respective first and second compartments;
means defining within said housing an annular chamber concentric to said axis;
two pairs of diametrically-opposed partitions subdividing said annular chamber into four segments;
passage means connecting the first compartments of a pair of adjacent cavities to the respective ends of one of said chamber segments and connecting the first compartments of the remaining pair of cavities to the respective ends of a second segment diametrically opposite to said one chamber segment;
additional passage means connecting the second compartments of one cavity of each of said pairs of cavities to the respective ends of a third one of said chamber segments and the second compartment of the remaining cavity of each of said pairs of cavities to the remaining fourth chamber segment;
fluid filling all of said chamber segments, compartments, and passage means; and
means to sense, and generate a signal proportional to deflection of, said diaphragms.

5. An angular accelerometer according to claim 4 wherein said fluid is an electrolyte and said last named means in an electrolytic detector constructed and arranged to generate an electrical signal proportional to changes in proximity of the diaphragms thereto and electrically connected to effect cancellation of the electrical signals when the change in proximity is of opposite sense.

6. An angular accelerometer according to claim 5 including a pressurized reservoir for said fluid in communication with each of said chamber segments.

7. An angular accelerometer according to claim 5 wherein said fluid is an electrolyte and said detecting means comprises a pair of electrodes projecting into each of said cavities and terminating adjacent one side of the diaphragm in the chamber, said side of the diaphragm being electrically conductive whereby the current flow between the electrodes is determined by the amount of electrolyte between the electrodes and said side of the diaphragm, which, in turn, is determined by the extent of deflection of the diaphragm.

8. An angular accelerometer comprising:
a housing;
partition means defining within said housing four substantially identical cavities of circular cross-section in a plane perpendicular to an axis through said housing, said cavities being equiangularly disposed about said axis at equal radial distances therefrom;
a diaphragm in each of said cavities, each diaphragm lying in a common plane perpendicular to said axis and subdividing the respective cavities into corresponding first and second compartments disposed respectively on opposite sides of said common plane, each of said diaphragms being deflectable in response to pressure differentials between the respective first and second compartments;
means defining within said housing an annular chamber concentric to said axis and axially spaced from said cavities;
two pairs of diametrically opposed partitions subdividing said annular chamber into four segments;
axial passage means connecting said first compartments of a pair of adjacent cavities to the respective ends of one of said chamber segments and connecting said first compartments of the remaining pair of cavities to the respective ends of a second chamber segment diametrically opposite to said one chamber segment;
additional axial passage means connecting said second compartments of one cavity of each of said pairs of cavities to the respective ends of a third one of said chamber segments and said second compartments of the remaining cavity of each of said pairs of cavities to the remaining fourth chamber segment;
an electrolytic liquid filling all of said compartments, chamber segments, and passage means;
a pair of electrodes projecting into a corresponding compartment of each of said cavities and terminating adjacent the surface of the respective diaphragms therein, said surface being electrically conductive; and
bridge circuit means connected to said electrodes with each pair of electrodes connected in series forming one leg of the bridge, the electrodes of adjacent cavities forming opposite legs of the bridge.

9. An angular accelerometer according to claim 8 including:
a pressurized reservoir chamber for said liquid within said housing; and
means, including individual conduits for each of said chamber segments, placing said segments in flow communication with said reservoir chamber.

References Cited by the Examiner

UNITED STATES PATENTS

| | | | |
|---|---|---|---|
| 2,322,003 | 6/43 | Farmer | 73—516 |
| 2,411,117 | 11/46 | Scherbatskoy | 340—17 |
| 2,644,901 | 7/53 | Hardway | 73—516 |
| 2,975,641 | 3/61 | Lees | 73—503 |
| 2,983,149 | 5/61 | Lees | 73—503 |
| 3,008,334 | 11/61 | Lees | 73—516 |
| 3,098,393 | 7/63 | Cook | 73—516 |

RICHARD C. QUEISSER, *Primary Examiner.*

JOSEPH P. STRIZAK, JAMES J. GILL, *Examiners.*